United States Patent Office.

PAUL FRIEDLAENDER AND BERNHARD PRIEBS, OF OFFENBACH-ON-THE-MAIN, GERMANY, ASSIGNORS TO K. OEHLER, OF SAME PLACE.

PRODUCTION OF ORANGE AZO DYE-STUFFS.

SPECIFICATION forming part of Letters Patent No. 375,930, dated January 3, 1888.

Application filed May 20, 1887. Serial No. 238,894. (Specimens.)

*To all whom it may concern:*

Be it known that we, PAUL FRIEDLAENDER and BERNHARD PRIEBS, subjects of the Emperor of Germany, and residing at Offenbach-on-the-Main, have invented new and useful Improvements in Orange Azo Dye-Stuffs from tetrazo ditolyl chloride, metatoluylenediamine sulpho acid, and salicylic acid, of which the following is a specification.

The orange coloring-matter to which our invention relates belongs to the class of the so-called "azo" compounds, and results by the action of one molecule of tetrazo-ditolyl chloride on one molecule of metatoluylenediamine sulpho-acid (see Wiesinger, Berichte der Deutschen Chemischen Gesellschaft, VII, 464) and one molecule of salicylic acid.

In carrying out our invention we first prepare a solution of the hydrochlorate of tetrazo-ditolyl by mixing thirty-one pounds of sulphate of tolidine, twenty-five pounds of muriatic acid, (20° Baumé,) and five hundred pounds of water, and adding to this mixture a solution of fourteen pounds of nitrate of soda in fifty pounds of water. It must be taken care to keep the mixture cool during the operation, the end of which is indicated by the dissolving of the sulphate of tolidine. The so-prepared solution of the hydrochloride of tetrazo ditolyl is then allowed to run slowly into a cold solution of 20.2 pounds of metatoluylenediamine sulpho-acid and 21.2 pounds of dry soda in one thousand pounds of water. To this liquid, which contains a brown insoluble precipitate, are added sixteen pounds of the soda-salt of salicylic acid in five hundred pounds of water, whereupon the whole mixture is allowed to stand at a temperature of 30° to 40° centigrade until the precipitate disappears and a clear orange solution results. The coloring-matter is then precipitated by adding a sufficient quantity of salt, filtered, pressed, and dried.

The chief characteristics of the dye-stuff prepared by the above process are as follows: It has the appearance of a reddish-brown powder and dissolves easily in hot water with an orange color. It is insoluble in hydrocarbons. It is precipitated out of its watery solution by addition of dilute mineral acids in brown-red flakes, which dissolve in concentrated sulphuric acid with violet color. It shows a striking affinity for the raw-cotton fiber, which may be dyed without employing any mordant, and stands soaping and dilute mineral acids.

Having thus described our invention and the manner of employing the same, what we claim, and wish to have secured by Letters Patent of the United States of America, is—

1. The process of producing the coloring-matter herein described, consisting in preparing a solution of tetrazo-ditolylchloride from sulphate of tolidine, in adding this solution to a solution of metatoluylenediamine sulpho-acid and afterward adding a solution of salicylic acid, substantially as herein described.

2. The orange azo dye-stuff herein described, consisting of a reddish-brown powder easily soluble in hot water with an orange color, insoluble in hydrocarbons, and capable of precipitation from its watery solution by addition of dilute mineral acids in brown-red flakes which dissolve in concentrated sulphuric acid with violet color.

In testimony whereof we have signed our names to this specification in the presence of two subscribing witnesses.

PAUL FRIEDLAENDER.
BERNHARD PRIEBS.

Witnesses:
FRANZ HASSLACHER,
JOSEPH PATRICK.